(12) United States Patent
Reddy et al.

(10) Patent No.: US 7,687,440 B2
(45) Date of Patent: Mar. 30, 2010

(54) WELLBORE SEALANT COMPOSITIONS CONTAINING CATIONIC LATEXES

(75) Inventors: B. Raghava Reddy, Duncan, OK (US); Samuel J. Lewis, Duncan, OK (US); Ashok K. Santra, Duncan, OK (US); Anthony V. Palmer, Ardmore, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 976 days.

(21) Appl. No.: 11/291,795

(22) Filed: Dec. 1, 2005

(65) Prior Publication Data

US 2007/0125276 A1    Jun. 7, 2007

(51) Int. Cl.
C04B 40/00 (2006.01)
C09K 8/504 (2006.01)
C09K 8/588 (2006.01)
E21B 33/13 (2006.01)

(52) U.S. Cl. .................. 507/219; 106/819; 106/823; 166/292; 166/293; 507/222; 507/225; 507/229; 507/269

(58) Field of Classification Search .............. 507/219, 507/222, 225, 229, 269; 106/819, 823; 166/293, 166/292
See application file for complete search history.

(56) References Cited

U.S. PATENT DOCUMENTS

| | | | |
|---|---|---|---|
| 3,108,979 | A | 10/1963 | Le Fevre et al. |
| 3,147,128 | A | 9/1964 | Harrell |
| 3,320,077 | A | 5/1967 | Prior |
| 3,399,159 | A | 8/1968 | Samour |
| 4,127,001 | A * | 11/1978 | Tomic ................ 405/259.6 |
| 4,158,570 | A | 6/1979 | Irwin |
| 4,560,736 | A | 12/1985 | Pischke et al. |
| 4,791,161 | A | 12/1988 | Leising |
| 5,069,721 | A | 12/1991 | Tamura et al. |
| 5,159,980 | A | 11/1992 | Onan et al. |
| 5,213,161 | A | 5/1993 | King et al. |
| 5,220,960 | A | 6/1993 | Totten et al. |
| 5,281,270 | A | 1/1994 | Totten et al. |
| 5,293,938 | A | 3/1994 | Onan et al. |
| 5,298,069 | A | 3/1994 | King et al. |
| 5,346,012 | A | 9/1994 | Heathman et al. |
| 5,588,488 | A | 12/1996 | Vijn et al. |
| 5,688,844 | A | 11/1997 | Chatterji et al. |
| 5,795,924 | A | 8/1998 | Chatterji et al. |
| 5,820,670 | A * | 10/1998 | Chatterji et al. .............. 106/737 |
| 5,897,699 | A | 4/1999 | Chatterji et al. |
| 5,900,053 | A | 5/1999 | Brothers et al. |
| 5,913,364 | A | 6/1999 | Sweatman |
| 5,945,387 | A | 8/1999 | Chatterji et al. |
| 5,964,293 | A | 10/1999 | Chatterji et al. |
| 6,063,738 | A | 5/2000 | Chatterji et al. |
| 6,098,711 | A | 8/2000 | Chatterji et al. |
| 6,143,069 | A | 11/2000 | Brothers et al. |
| 6,156,808 | A | 12/2000 | Chatterji et al. |
| 6,167,967 | B1 | 1/2001 | Sweatman |
| 6,171,386 | B1 | 1/2001 | Sabins |
| 6,177,483 | B1 * | 1/2001 | Tehrani et al. .............. 523/130 |
| 6,234,251 | B1 | 5/2001 | Chatterji et al. |
| 6,258,757 | B1 | 7/2001 | Sweatman et al. |
| 6,271,181 | B1 | 8/2001 | Chatterji et al. |
| 6,297,202 | B1 | 10/2001 | Chatterji et al. |
| 6,328,106 | B1 | 12/2001 | Griffith et al. |
| 6,332,921 | B1 | 12/2001 | Brothers et al. |
| 6,401,817 | B1 | 6/2002 | Griffith et al. |
| 6,448,206 | B1 | 9/2002 | Griffith et al. |
| 6,488,763 | B2 | 12/2002 | Brothers et al. |
| 6,508,306 | B1 | 1/2003 | Reddy et al. |
| 6,516,884 | B1 | 2/2003 | Chatterji et al. |
| 6,555,507 | B2 | 4/2003 | Chatterji et al. |
| 6,593,402 | B2 | 7/2003 | Chatterji et al. |
| 6,641,660 | B1 | 11/2003 | Chatterji et al. |
| 6,664,215 | B1 | 12/2003 | Tomlinson |
| 6,668,928 | B2 | 12/2003 | Brothers |
| 6,722,433 | B2 | 4/2004 | Brothers et al. |
| 6,796,378 | B2 | 9/2004 | Reddy et al. |
| 6,797,054 | B2 | 9/2004 | Chatterji et al. |
| 6,846,357 | B2 | 1/2005 | Reddy et al. |
| 6,881,708 | B2 | 4/2005 | Reddy et al. |
| 6,904,971 | B2 | 6/2005 | Brothers et al. |
| 6,926,081 | B2 | 8/2005 | Sweatman et al. |
| 6,951,249 | B1 | 10/2005 | Chatterji et al. |
| 6,953,505 | B1 | 10/2005 | Chatterji et al. |
| 2003/0181338 | A1 | 9/2003 | Sweatman et al. |
| 2004/0040711 | A1 | 3/2004 | Tomlinson |
| 2007/0111901 | A1 | 5/2007 | Reddy et al. |
| 2007/0125534 | A1 | 6/2007 | Reddy et al. |

FOREIGN PATENT DOCUMENTS

| EP | 0 118 327 | 9/1984 |
|---|---|---|
| EP | 0 816 301 A2 | 1/1998 |
| GB | 2 317 896 | 4/1998 |

OTHER PUBLICATIONS

Office Action dated Jun. 21, 2007(16 pages), U.S. Appl. No. 11/291,719, filed Dec. 1, 2005.
Office Action dated Dec. 11, 2007 (7 pages), U.S. Appl. No. 11/291,719, filed Dec. 1, 2005.
XP-002419244, Derwent Publications LTD, dated Jan. 24, 1984 by Uchida M.
XP-002419245, Derwent Publications LTD, dated Jan. 29, 1998 by Fuyo Parlight KK.

(Continued)

*Primary Examiner*—Timothy J. Kugel
(74) *Attorney, Agent, or Firm*—Craig W. Roddy; Conley Rose, P.C.

(57) ABSTRACT

A wellbore sealant composition comprising a cementitious material and a cationic latex into the wellbore.

21 Claims, No Drawings

OTHER PUBLICATIONS

Foreign Communication related to a counterpart application dated Feb. 22, 2007.
Halliburton brochure entitled "D-Air 3000 and D-Air 3000L defoamers" dated 1999.
Halliburton brochure entitled "Halliburton's DrillAhead Services® Services" dated 2005.
Halliburton brochure entitled "Wellbore stability challenges? To get ahead, think ahead. DrillAhead® Services" dated 2004.
Halliburton brochure entitled "FlexPlug® OBM Lost-Circulation Material" dated 2004.
Halliburton brochure entitled "FlexPlug® Service" dated 1998.
Halliburton brochure entitled "FlexPlug® W Lost-Circulation Material" dated 2004.
Halliburton brochure entitled "Latex 2000 Cement Additive" dated 1998.
Halliburton brochure entitled "ThermaLock™ Cement for Corrosive CO2 Environments" dated 1999.
Halliburton brochure entitled "ThermaLock™ Cement for Corrosive CO2 Environments" dated 2005.
Halliburton brochure entitled "Thermatek Service" dated 2005.
Hewlett Peter C. "Lea's Chemistry of Cement and Concrete" Fourth Edition, pp. 813-820, 1998.
Sweatman, Ronald et al., "Acid-Soluble Magnesia Cement: New Applictions in Completion and Workover Operation" dated 1990.
Office Action dated Aug. 4, 2008 (16 pages), U.S. Appl. No. 11/291,719, filed Dec. 1, 2005.
Office Action dated Jan. 9, 2009 (19 pages), U.S. Appl. No. 11/291,719, filed Dec. 1, 2005.
Office Action dated Jun. 9, 2009 (22 pages), U.S. Appl. No. 11/219,719, filed Dec. 1, 2005.
Advisory Action dated Aug. 21, 2009 (3 pages), U.S. Appl. No. 11/291,719 filed on Dec. 1, 2005.
Office Action dated Sep. 11, 2009 (28 pages), U.S. Appl. No. 11/291,719 filed on Dec. 1, 2005.

* cited by examiner

US 7,687,440 B2

WELLBORE SEALANT COMPOSITIONS CONTAINING CATIONIC LATEXES

CROSS-REFERENCE TO RELATED APPLICATIONS

This application is related to commonly owned U.S. patent application Ser. No. 11/291,719, published as U.S. 2007/0125534 A1 on Jun. 7, 2007, and entitled "Methods of Using Wellbore Sealant Compositions Containing Cationic Latexes," which is incorporated by reference herein in its entirety.

STATEMENT REGARDING FEDERALLY SPONSORED RESEARCH OR DEVELOPMENT

Not applicable.

BACKGROUND OF THE INVENTION

1. Field of the Invention

This invention relates to servicing a wellbore. More specifically, it relates to servicing a wellbore with sealant compositions comprising a cationic latex and methods of using same.

2. Background of the Invention

Natural resources such as gas, oil, and water residing in a subterranean formation or zone are usually recovered by drilling a wellbore down to the subterranean formation while circulating a drilling fluid in the wellbore. After terminating the circulation of the drilling fluid, a string of pipe, e.g., casing, is run in the wellbore. The drilling fluid is then usually circulated downward through the interior of the pipe and upward through the annulus, which is located between the exterior of the pipe and the walls of the wellbore. Next, primary cementing is typically performed whereby a cement slurry is placed in the annulus and permitted to set into a hard mass (i.e., sheath) to thereby attach the string of pipe to the walls of the wellbore and seal the annulus. Subsequent secondary cementing operations may also be performed.

Fluids used in servicing a wellbore may be lost to the subterranean formation while circulating the fluids in the wellbore. These fluids may enter the subterranean formation via permeable zones such as depleted zones, zones of relatively low pressure, lost circulation zones having naturally occurring fractures, weak zones having fracture gradients exceeded by the hydrostatic pressure of the servicing fluid, and so forth. As a result, the service provided by such fluids is more difficult to achieve. Also, the loss of such fluids increases the cost of the overall operation due to the prolonged rig time required, the fluids being relatively expensive, and possibly a need to install casing.

There are a variety of methodologies for combating drilling fluid circulation losses. Such methodologies may involve adding loss prevention materials to the drilling fluid itself and continue the drilling process or pump fluid until fluid circulation is restored. Similarly, cementing slurries may be lost to the formation during placement for a variety of reasons, including exceeding the fracture gradient of the formation because of high hydrostatic pressures. Specific methods for preventing fluid circulation losses include pumping cement slurries containing cement in an aqueous or nonaqueous fluid, sodium silicate solutions, or latex based fluids and causing them to mix with another appropriate fluid to form solid plugs in the loss circulation zones.

When such methods are successful in preventing drilling fluid circulation losses, the operators may case the wellbore or use a drill ahead process (vide infra). For example, operators may temporarily stop drilling operations, case the well bore, and cement the casing before resuming further drilling, which may result in a reduced well bore diameter from that point forward. Casing the wellbore is practiced when the loss circulation treatment is not strong enough to withstand hydrostatic pressure of the drilling fluid if drilling is resumed without casing the well bore. Alternatively, it is more economical during the well construction phase and more profitable during the production phase if the loss circulation treatment provides sufficient reinforcement to the loss circulation zone such that it can withstand hydrostatic pressure from further drilling without resorting to casing the wellbore. This will not only save the cost of casing, but it will also lead to a wider well bore diameter upon completion which will increase fluid production rates. The latter process is referred to as "drill ahead" process in the industry.

Another oil field related problem that occurs either during well construction or in mature oilwells is unwanted water production. While hydrocarbon-producing wells are usually completed in hydrocarbon-bearing formations, such formations may contain, or may be adjacent to, water-bearing sections. Generally, the term "water-bearing section" refers to any portion of a subterranean formation that may produce water, including a hydrocarbon-bearing section that has sufficiently high water saturation such that water may be produced along with hydrocarbons. The high mobility of the water may allow it to flow into the well bore by way of natural fractures and/or high permeability streaks present in the formation. During oilwell construction, drilling through a fresh water zone may cause water flow into the wellbore through natural or induced fractures. The production of water with hydrocarbons from subterranean wells constitutes a major problem and expense in the production of the hydrocarbons. Over the life of such wells, the ratio of water to hydrocarbons recovered may be undesirable in view of the cost of producing the water, separating it from the hydrocarbons, and disposing of it, which can represent a significant economic loss.

Subterranean stimulation treatments have long been used in the field of hydrocarbon production to increase the flow of hydrocarbons to the well bore. One such stimulation treatment is hydraulic fracturing, where specialized fluids are pumped into the subterranean formation at sufficient pressures to create or enhance at least one fracture within the formation, thereby increasing fluid flow through the formation to the well bore. When a formation contains water-bearing sections, however, the water level will increase continuously over time and may reach a point when the fracture need to be plugged and a new fracture introduced at a different depth in the wellbore. In all such cases to control the production of unwanted water through fractures, corrective fluids containing sealant compositions, for example cementitious compositions, need to be pumped into the fracture and allowed to plug them. Such methods of controlling water production are frequently referred to as conformance control. Magnesium salt based sealant systems typically referred to as Sorel cements, comprising magnesium oxide and a soluble salt, for example magnesium chloride, magnesium sulfate or ammonium mono or dibasic phosphate have been found to be suitable for such conformance control applications. Sorel cements based on magnesium chloride and magnesium sulfates as soluble salts suffer from instability upon exposure to water. The instability manifests as the development of cracks in a short time upon exposure to water and the subsequent loss of structural integrity as a sealant.

Anionic latex has been used as an additive to modify the properties of cement slurries. For cementing wells with acidic gases, such as carbon dioxide or formation fluids containing hydrogen sulfide, high alumina cements are typically employed. These cements may also be used in the cementing of high temperature wells. The use of anionic latex, for the purpose of fluid loss control, permeability reduction or mechanical property modification of high alumina cements has often resulted in cement slurries with poor fluid loss control and in set cement compositions that leach latex into the aqueous fluids surrounding the cement. Leaching of the latex by water over the lifetime of the well increases the permeability of the set cement and detrimentally affects its mechanical properties by reducing its strength and elasticity.

Accordingly, a need exists for improved wellbore sealant compositions suitable for lost circulation applications, and in particular with drill ahead operations. A need also exists for improved magnesium salt-based sealant compositions that are more resistant to structural degradation, and in particular in conformance control operations. A need also exists for improved sealant composition comprising latex that does not leach out of the sealant composition, an in particular high alumina based sealant compositions. The present disclosure addresses such needs as well an others that may be apparent to those skilled in the art.

BRIEF SUMMARY OF SOME OF THE PREFERRED EMBODIMENTS

Disclosed herein is a wellbore sealant composition comprising a cementitious material and a cationic latex into the wellbore.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

DETAILED DESCRIPTION OF THE PREFERRED EMBODIMENTS

Disclosed herein are sealant compositions comprising a cementitious material, which when mixed in an aqueous fluid may have a pH in the range of from about 3 to about 10, and a cationic latex. In an embodiment, said sealant compositions comprise a non-Portland cement and a cationic latex. In another embodiment, the sealant compositions comprise a high alumina cement and a cationic latex. Alternatively, the sealant compositions comprise magnesia (magnesium oxide), magnesium chloride, magnesium sulfate or soluble phosphate salts of ammonium or alkali metal ion and a cationic latex. As used herein, a "sealant composition" refers to a fluid used to drill, complete, work over, repair, or in any way prepare a wellbore for the recovery of materials residing in a subterranean formation penetrated by the wellbore. Examples of sealant compositions include, but are not limited to cement slurries, lost circulation pills, settable fluids, plugging compositions for plug-and-abandon purposes, chemical packers, temporary plugs, spacer fluids, completion fluids, or remedial fluids all of which are well known in the art. Such sealant compositions may be used in wellbore servicing operations as known to those skilled in the art.

In an embodiment, the sealant composition comprises a cationic latex. Cationic latexes may comprise latex forming monomers and positively charged monomers. Examples of latex forming monomers that may be used to produce cationic latexes include, without limitation, vinyl aromatic monomers (e.g., styrene based monomers), ethylene, butadiene, vinylnitrile (e.g., acrylonitrile), olefinically unsaturated esters of $C_1$-$C_8$ alcohol, or combinations thereof. In some embodiments, non-ionic monomers that exhibit steric effects and that contain long ethoxylate or hydrocarbon tails may also be present. Examples of positively charged monomers that may be used to produce cationic latexes include, without limitation those that already have a positive charge that cannot be neutralized at pH values greater than about 10, alternatively positively charged monomers which can be neutralized at pH values greater than about 10. Examples of the former monomer type include without limitation those containing quaternary ammonium groups, for example as in trimethylaminopropylmethacrylamide bromide or monomers containing other onium species such as trialkylsulfonium or tetraalkylphosphonium structures. Examples of the latter monomer type include without limitation protonated tertiary amine containing monomers, for example dimethylaminomethacrylamide which when polymerized in an acidic medium become cationic by protonation of amine nitrogen. Commercial examples of cationic latexes include without limitation ROADCHEM 600 or UP-65K which are cationic styrene-butadiene latexes available from VSS Asphalt Technologies and Ultrapave respectively.

Methods for preparation of a cationic latex are known to one skilled in the art. For example, a cationic latex may be prepared by conventional emulsion polymerization using an azo initiator such as 2,2'-azobis(isobutylamidine hydrochloride). Alternatively, the cationic latex may be produced through the copolymerization of a latex with cationic or amine containing comonomers. Methods of preparing cationic latexes are disclosed in U.S. Pat. Nos. 4,791,161; 4,560,736; 3,108,979; and 3,399,159, each of which is incorporated by reference herein in its entirety.

In an embodiment, the sealant composition may further comprise any cementitious material other than a Portland cement. In an embodiment, the sealant composition may further comprise a cementitious material that when mixed in water, the resultant sealant composition has a pH of from about 3 to about 10. Examples of suitable cementitious materials include but not are not limited to a high alumina cement, a magnesia-based cement, a gypsum cement, gypsum plaster, a zinc oxychloride cement, an aluminum oxychloride cement, a zinc phosphate cement, a silicophosphate cement, or combinations thereof.

In an embodiment, the hydraulic cement comprises a high alumina cement, a gypsum cement, a magnesia based cement or combinations thereof. Alternatively, the sealant composition comprises a high alumina cement, which comprises calcium, aluminum, and oxygen, and sets and hardens by reaction with water. Herein a high alumina cement refers to a cement having from about 35% to about 80% by weight of calcium aluminate. Such cements may further comprise small amounts of iron oxides and silica. Examples of suitable high alumina cementitious materials include without limitation SECAR 60, SECAR 51 and SECAR 71 which are high alumina hydraulic cements commercially available from Lafarge Aluminates, Cheasapeake, Va. and THERMALOCK cement which is a high alumina cement commercially available from Halliburton Energy Services. Cationic latexes are less effective when used in combination with Portland cements (e.g., Class A, C, G and H cements), and thus the cementitious material preferably excludes such Portland cements.

In an embodiment, the hydraulic cement comprises magnesia-based cements, also known as Sorel cements. Sorel cements are based on magnesia (magnesium oxide) and a soluble salt such as a soluble chloride, sulfate, or phosphate salt. Suitable salts include magnesium salts, for example magnesium chloride or magnesium sulfate or a soluble phosphate, for example mono- or dibasic ammonium phosphate. Examples of suitable magnesium oxides for the production of Sorel cement compositions include without limitation OXYMAG magnesia based cement product which is a finely ground magnesium oxide powder and AQUAMAG magnesium hydroxide which is an aqueous magnesium hydroxide suspension both commercially available from Premier Chemicals LLC, King of Prussia, Pa. Soluble magnesium salts such as magnesium chloride, magnesium sulfate and soluble phosphate salts such as ammonium phosphate are widely available commercially. A discussion of various magnesia-based cements can be found in Lea's Chemistry of Cement and Concrete by Peter Hewlett: Fourth Edition, pages 813-820: 2003: Elsevier Publishing.

In some embodiments, the sealant compositions comprising a cationic latex include a sufficient amount of water to form a pumpable cementitious slurry. The water may be fresh water or salt water, e.g., an unsaturated aqueous salt solution or a saturated aqueous salt solution such as brine or seawater. The water may be present in the amount from about 20 to about 180 percent by weight of cement, alternatively from about 28 to about 60 percent by weight of cement. The cement compositions may comprise a density from about 4 lb/gallon to about 23 lb/gallon. In alternative embodiments, the cement compositions may comprise a density from about 12 lb/gallon to about 17 lb/gallon. In other alternative embodiments, the cement compositions may be low-density cement compositions with a density from about 6 lb/gallon to about 14 lb/gallon.

In an embodiment, the sealant composition comprising a cationic latex further comprises a hydraulic cement and a non-aqueous carrier fluid that can viscosify or solidify when combined with an aqueous fluid in wellbore zones where a fluid (e.g., drilling fluid) is being lost. In such embodiments, the sealant compositions comprising a cationic latex includes a sufficient amount of a nonaqueous fluid to form a pumpable slurry. Such nonaqueous fluids are well known to one of ordinary skill in the art and include without limitation diesel, linear alpha olefins, mineral oil, esters or combinations thereof. Such sealant compositions comprising a nonaqueous fluid may require suspension aids, for example organophilic clay to prevent settling of cement particles. The amount of nonaqueous solvent to be included in the compositions may depend on the specific gravity of the nonaqueous fluid and slurry density desired. Methods for determining the amount of nonaqueous fluid needed to prepare the sealant compositions comprising a cationic latex are known to one of ordinary skill in the art.

A sealant composition comprising a cationic latex may further comprise salts of monovalent (e.g., $Na^+$), divalent (e.g., $Ca^{2+}$, $Mg^{2+}$), and trivalent cations. In such embodiments, the compositions may be saturated with the disclosed salts to ensure that they do not wash out or dissolve salt zones located in the subterranean formation. Alternatively, the sealant composition itself may require the use of salts, for example as in the case of magnesium oxide based Sorel cements. The cationic latex has a relatively high tolerance to salts. Thus, it may remain stable in the presence of the salts contained in the sealant compositions comprising a cationic latex and in the presence of salts that it may encounter in the wellbore without the need to introduce additional stabilizing surfactants, e.g., ethyoxylated nonylphenol surfactant, to the compositions. In an embodiment, the salts encountered in the wellbore do not raise the pH of the composition. It is to be understood that, if desired, stabilizing surfactants may be employed in the sealant compositions comprising a cationic latex and may be distinguished from ethylenically unsaturated surfactants incorporated in the backbone of the latex polymer.

In an embodiment, the sealant composition comprising a cationic latex further comprises a surfactant. The surfactant may be any surfactant that stabilizes the sealant composition comprising a cationic latex. In some embodiments the surfactant is anionic, alternatively cationic, alternatively neutral. Alternatively, the surfactants may be zwitterions (i.e. containing both anionic and cationic charges), which are commonly referred to as betaines. Zwitterionic surfactants containing sulfonate groups are referred to as sultaines. In an embodiment, the surfactant is a betaine such as cocoamidopropyl betaine, alternatively the surfactant is a sultaine such as cocoamidopropyl hydroxysulatine. Examples of suitable surfactants include without limitation HC-2 surface-active suspending agent which is a zwitterionic surfactant commercially available from Halliburton Energy Services and REWOTERIC AM HC, a sultaine commercially available from Witco Corporation, Dublin, Ohio.

The sealant composition comprising a cationic latex can further comprise additives for improving or changing its properties. Examples of suitable additives include fluid absorbing materials, hollow glass or ceramic beads, densifying materials such as haemetite, manganese oxides or barium sulfate, particulate materials, organophilic clay, superabsorbers for aqueous fluids, viscosifying agents, suspending aids, dispersing agents, set retarding agents, fluid loss agents, mechanical property modifying agents such as fibers, elastomers or combinations thereof.

The sealant compositions comprising a cationic latex can be used for any purpose. In an embodiment, the sealant composition comprising a cationic latex is used to service a wellbore that penetrates a subterranean formation. It is to be understood that "subterranean formation" encompasses both areas below exposed earth and areas below earth covered by water such as ocean or fresh water. Servicing a wellbore includes, without limitation, positioning the sealant composition comprising a cationic latex in the wellbore to isolate the subterranean formation from a portion of the wellbore; to support a conduit in the wellbore; to plug a void or crack in the conduit; to plug a void or crack in a cement sheath disposed in an annulus of the wellbore; to plug a perforation; to plug an opening between the cement sheath and the conduit; to prevent the loss of aqueous or nonaqueous drilling fluids into loss circulation zones such as a void, vugular zone, or fracture; to plug a well for abandonment purposes; a temporary plug to divert treatment fluids; as a chemical packer to be used as a fluid in front of cement slurry in cementing operations; and to seal an annulus between the wellbore and an expandable pipe or pipe string. For instance, the sealant composition comprising a cationic latex may viscosify in a loss-circulation zone and thereby restore circulation. The viscosified mixture can set into a flexible, resilient and tough material, which may prevent further fluid losses when circulation is resumed. The sealant composition comprising a cationic latex may withstand substantial amounts of pressure, e.g., the hydrostatic pressure of a drilling fluid or cement slurry, without being dislodged or extruded. In an embodiment the sealant composition comprising a cationic latex sets into a hard mass with compressive strengths of from about 250 psi to about 15000 psi. Herein the compressive strength is defined as the capacity of a material to withstand axially directed pushing forces. The maximum resistance of a material to an axial force is determined in accordance with American Petroleum Institute (API) Specification 10A, $23^{rd}$ Edition, April 2002. Beyond the limit of the compressive strength, the material becomes irreversibly deformed and no longer provides structural support and/or zonal isolation.

The sealant composition comprising a cationic latex may form a sealant composition and provide a relatively viscous mass inside the loss-circulation zone. The sealant composition comprising a cationic latex can also form a non-flowing, intact mass inside the loss-circulation zone. This mass plugs the zone and inhibits loss of subsequently pumped drilling fluid, which allows for further drilling. It is to be understood that, it may be desired to hasten the viscosification reaction for swift plugging of the voids. In another embodiment, it may be desired to prolong or delay the viscosification for deeper penetration into the voids. The active polymer content of the latex emulsion may range from about 0.2% to about 30% by weight of the cement composition, alternatively from about 3% to about 15% by weight of the cement composition.

In an embodiment, the sealant composition comprising a cationic latex is placed into a wellbore as a single stream and activated by downhole conditions to form a barrier that substantially seals loss circulation zones. In another embodiment, the sealant composition comprising a cationic latex may be constituted downhole as a two stream combination. In such a process, the components of the sealant system may be injected in aqueous or nonaqueous or combination fluids. In an embodiment, the cationic latex is present in the aqueous stream. The cementitious materials may be introduced into the wellbore in a nonaqueous fluid and caused to mix with the aqueous fluid containing the cationic latex. Thus for example, when the cementitious material comprises a single cementitious material such as gypsum or high aluminate cement (for example calcium aluminate) such material may be suspended in a nonaqueous fluid and pumped down the drill pipe or casing and allowed to contact an aqueous stream containing the cationic latex pumped down the annulus. Alternatively, the nonaqueous stream containing the cementitious material may be pumped down the annulus, and the latex containing aqueous stream pumped down the drill pipe or casing. On the other hand, when the cementitious material requires two components to set, for example as in the case of Sorel cements, one component, for example magnesium oxide, may be pumped as a nonaqueous suspension down the drill pipe or down the annulus. The aqueous stream containing the cationic latex and the second component of the cementitious composition, for example a soluble salt such as magnesium chloride, magnesium sulfate or ammonium monobasic or dibasic phosphate may be pumped down the annulus or down the drill pipe or casing. In an embodiment, a sealant composition comprising a magnesia based cement and a latex made cationic because of its preparation at acidic pH, is prepared using a two stream method by contacting said cement as a nonaqueous suspension with a second aqueous cationic latex stream which is allowed to mix downhole.

Methods for introducing compositions into a wellbore to seal subterranean zones are described in U.S. Pat. Nos. 5,913,364; 6,167,967; and 6,258,757, each of which is incorporated by reference herein in its entirety.

In an embodiment, the sealant compositions comprising a cationic latex may be employed in well completion operations such as primary and secondary cementing operations. Said compositions may be placed into an annulus of the wellbore and allowed to set such that it isolates the subterranean formation from a different portion of the wellbore. The sealant compositions comprising a cationic latex thus form a barrier that prevents fluids in that subterranean formation from migrating into other subterranean formations. Within the annulus, the fluid also serves to support a conduit, e.g., casing, in the wellbore.

In an embodiment, the wellbore in which the sealant compositions comprising a cationic latex is positioned belongs to a multilateral wellbore configuration. It is to be understood that a multilateral wellbore configuration includes at least two principal wellbores connected by one or more ancillary wellbores. In secondary cementing, often referred to as squeeze cementing, the wellbore sealant composition comprising a cationic latex may be strategically positioned in the wellbore to plug a void or crack in the conduit, to plug a void or crack in the hardened sealant (e.g., cement sheath) residing in the annulus, to plug a relatively small opening known as a microannulus between the hardened sealant and the conduit, and so forth, thus acting as a sealant composition. Various procedures that may be followed to use a sealant composition in a wellbore are described in U.S. Pat. Nos. 5,346,012 and 5,588,488, which are incorporated by reference herein in their entirety.

In other embodiments, additives are also pumped into the wellbore with the sealant compositions comprising a cationic latex. For instance, fluid absorbing materials, particulate materials, organophilic clay, resins, aqueous superabsorbers, viscosifying agents, suspending agents, dispersing agents, fluid loss agents, mechanical property modifying agents such as fibers, elastomers or combinations thereof can be pumped in the stream with the compositions disclosed.

In an embodiment, the sealant compositions comprising a high alumina cement and a cationic latex exhibit good fluid loss control of the cement slurry and have reduced leaching when compared to an otherwise identical composition lacking a cationic latex. In another embodiment, the sealant compositions comprising a magnesia-based cement and a cationic latex exhibit increased structural integrity when compared to an otherwise identical composition lacking a cationic latex.

EXAMPLES

The invention having been generally described, the following examples are given as particular embodiments of the invention and to demonstrate the practice and advantages thereof. It is understood that the examples are given by way of illustration and are not intended to limit the specification of the claims in any manner.

Example 1

The mechanical properties and leaching of high aluminate cement slurries with and without a cationic styrene-butadiene latex, JG-6082, obtained from Dow Reichhold Corporation were compared. A cement slurry was prepared containing the THERMALOCK cement, 39% water, 0.4% citric acid and D-AIR 3000L incorporated at 0.01 gal/sk D-AIR 3000L antifoaming agent is a defoamer and THERMALOCK cement is a high alumina cement both commercially available from Halliburton Energy Services. The slurry had a final density of 15 ppg. All percentages given are by weight of cement. Two additional slurries were prepared containing either 0.5 gal/sk or 1.0 gal/sk cationic latex (as indicated), 0.06 gal/sk of HC-2, 34% water and 0.05 gal/sk DAIR 3000L defoamer. HC-2 surface-active suspending agent is a zwitterionic surfactant commercially available from Halliburton Energy Services. Slurries containing the cationic latex had a final density of 14.9 ppg. All slurries were cured at 190° F. for 72 hours under a pressure of 3000 psi. The mechanical properties, namely Young's modulus and Poisson's Ratio were determined in accordance with ASTM D 3148-02 (Standard Test Method for Elastic Moduli of Intact Rock Core Specimens in Uniaxial Compression) method while leachability of the latex was determined by placing the set cement in water at 80° F. for 18 hours and observing if the water became cloudy indicating leaching of the latex into solution. Compressive strengths were measured as described in American Petroleum Institute (API) Specification 10A, $23^{rd}$ Edition, April 2002. Tensile strengths were measured on dog-bone shaped briquettes according to the procedure described for the test CRD-C260-01 in the U.S. Army Corps of Engineers' Handbook for Concrete and Cement. The results of these experiments are presented in Table 1. The results demonstrate that slurry formulations containing the cationic latex had reduced leachability.

TABLE 1

| Latex | Latex Amount | Compressive Strength, psi | Tensile Strength, psi | Leachability* | Young's Modulus | Poisson's Ratio |
|---|---|---|---|---|---|---|
| None | NONE | 5280 | 370 | NA** | 1.58E+6 | 0.210 |
| Cationic | 0.5 gal/sk | 3080 | 265 | NO | 7.5E+5 | 0.178 |
| Cationic | 1.0 gal/sk | 860 | 90 | NO | 4.0E+5 | 0.171 |

*Leachability was determined by visual observation
**NA = not applicable

Example 2

Different latexes were compared for their ability to improve permeability, leachability, material strength, and fluid loss. A base slurry formulation is given in Table 2.

TABLE 2

| Material | Amount | Unit | Weight |
|---|---|---|---|
| Water | 23% | bwoc | 163.7 |
| THERMALOCK cement | 100% | bwoc | 711.67 |
| Carbon fibers | 5% | bwoc | 35.6 |
| Latex | 2.45 | gal/sk | 199.3 |
| Fe-2 | 0.175% | bwoc | 1.23 |
| HC-2 | 0.12 | gal/sk | 10.4 |
| DAIR 3000L antifoaming agent | 0.10 | gal/sk | 8.1 |

To the base slurry formulation was added Latex 2000 or Cationic latex. Latex 2000 cement additive is a traditional anionic styrene-butadiene latex commercially available from Halliburton Energy Services. Cationic latex used in Examples 1-4 is a cationic styrene butadiene latex commercially available as JG-6082 from Dow Reichhold Inc. The slurries had a final density of 14.0 ppg and were cured at 190° F. for 72 hours. The mechanical properties and leachability of the set slurry were determined as described in Example 1 and are presented in Table 3. Fluid loss was measured according to American Petroleum Institute (API) Specification 10A, $23^{rd}$ Edition, April 2002. Cement permeability was measured using a cement permeameter according to the procedure described in American Petroleum Institute (API) Specification 10A, $23^{rd}$ Edition, April 2002.

TABLE 3

| Composition # | Additive | Compressive Strength, psi | Permeability | Latex Leachability | Fluid Loss, ml |
|---|---|---|---|---|---|
| 1 | LATEX 2000 latex | 1694 | 0.63 mD | YES | 45 |
| 2 | Cationic Latex | 2610 | 0.000723 mD | NO | 38 |

The results demonstrate that the addition of a cationic latex improves fluid loss, reduces permeability, improves mechanical strength and reduces leachability of the set composition upon exposure to water.

Example 3

Composition 2 of Example 2 was cured at 250° F. for 10 days and the mechanical properties and permeability of the composition determined. Results are given in Table 4.

TABLE 4

| Compressive Strength | Fluid Loss, | Thickening Time | Permeability | Tensile Strength | Young's Modulus | Poisson's Ratio |
|---|---|---|---|---|---|---|
| 5800 psi | 38 ml | 5 hrs | 0.00081 | 289 psi | $1.2 \times 10^6$ | 0.223 |

The results demonstrate addition of a cationic latex provided a less brittle composition with improved elasticity.

Example 4

A cement composition was prepared having the following general slurry design; 690 g $MgCl_2$, 690 g MgO, 300 g $H_2O$ and the indicated amount of JG-6082 was added to the base slurry. JG-6082 is cationic latex commercially available from Dow Reichhold Inc as a 50% aqueous emulsion. The samples were poured in plastic containers with lids and cured in an oven at 140° F. for 72 hrs. The cured samples were taken out of the plastic containers and kept in water. The time lapsed before visible cracks developed in the solid samples was noted. Table 5 shows the time for loss of structural integrity as evinced by the appearance of cracks.

TABLE 5

| | Cationic Latex | Cationic Latex | Cationic Latex | Control with no latex |
|---|---|---|---|---|
| Additive Amount[1] | 6.67% | 13.3% | 20% | NONE |
| Crack appeared after | 12-16 hours | 24-36 hours | >10 days | 5-8 hours |

[1] Additive amount is given as by weight of MgO.

The results demonstrate a significant delay before the loss of structural integrity for magnesia based cement compositions comprising a cationic latex when compared to an otherwise identical composition lacking said latex.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference herein is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A wellbore sealant composition comprising a cementitious material and a cationic latex, wherein the composition has a pH of from about 3 to about 10 and wherein the cementitious material consists essentially of a non-Portland cement.

2. The composition of claim 1 wherein the sealant composition comprises a magnesia-based cement further comprising magnesium oxide and a salt.

3. The composition of claim 2 wherein the salt is magnesium chloride, magnesium sulfate, soluble phosphate salts of ammonium, soluble phosphate salts of alkali metals, or combinations thereof.

4. The composition of claim 1 wherein the cationic latex comprises a latex-forming monomer and a cationic monomer.

5. The composition of claim 4 wherein the latex-forming monomer is a vinyl aromatic monomer, ethylene, butadiene, vinylnitrile, olefinically unsaturated esters of $C_1$-$C_8$ alcohol, a compound containing long ethoxylate or hydrocarbon tails, or combinations thereof.

6. The composition of claim 4 wherein the latex-forming monomer is styrene, butadiene or combinations thereof.

7. The composition of claim 4 wherein the cationic monomer comprises quaternary ammonium groups, onium species, sulfonium groups, phosphonium groups, tertiary amines, or combinations thereof.

8. The composition of claim 4 wherein the cationic latex comprises trimethylaminopropylmethacrylamide, trialkylsulfonium compounds, tetraalkylphosphonium compounds, acid-polymerized dimethylaminomethacrylamide, or combinations thereof.

9. The composition of claim 1 wherein the sealant composition further comprises a zwitterionic surfactant having a sulfonate group.

10. The composition of claim 9 wherein the zwitterionic surfactant comprises cocoamidopropyl betaine, cocoamidopropyl hydroxysultaine, or combinations thereof.

11. The composition of claim 1 wherein the cementitious material comprises alumina cement and the cationic latex comprises a styrene-butadiene copolymer.

12. The composition of claim 11 further comprising a zwitterionic surfactant.

13. The composition of claim 1 wherein the cementitious material comprises a magnesia-based cement and the cationic latex comprises a styrene-butadiene copolymer.

14. The composition of claim 13 wherein the magnesia-based cement comprises magnesium oxide and magnesium chloride.

15. The composition of claim 1 wherein the cementitious material comprises an alumina cement, a magnesia-based cement, a gypsum cement, a zinc oxychloride cement, an aluminum oxychloride cement, a zinc phosphate cement, a silicophosphate cement, or combinations thereof.

16. The composition of claim 1 wherein the cementitious material comprises a gypsum cement.

17. The composition of claim 1 wherein the sealant composition comprises an alumina cement having from about 35 wt. % to about 80 wt. % calcium aluminate.

18. The composition of claim 1 wherein the active polymer content of the latex emulsion is present in an amount of from about 0.2% to about 30% by weight of the cement composition.

19. The composition of claim 1 wherein the sealant composition further comprises a salt of a monovalent cation, a salt of a divalent cation, a salt of a trivalent cation or combinations thereof.

20. The composition of claim 1 wherein the sealant composition further comprises an anionic, cationic, neutral or zwitterionic surfactant, or combinations thereof.

21. The composition of claim 1 having a reduced permeability when compared to an otherwise similar composition comprising an anionic latex.

* * * * *